United States Patent
Staub et al.

(10) Patent No.: US 10,155,407 B2
(45) Date of Patent: Dec. 18, 2018

(54) SYSTEM AND METHOD FOR PRODUCING AN INDIVIDUALIZED SECURITY ELEMENT

(71) Applicant: OVD Kinegram AG, Zug (CH)

(72) Inventors: Rene Staub, Hagendorn (CH); Christina Streb, Abtwil (CH); Attila Ozdemir, Cham (CH); Thomas Muller, Oberageri (CH)

(73) Assignee: OVD KINEGRAM AG, Zug (CH)

( * ) Notice: Subject to any disclaimer, the term of this patent is extended or adjusted under 35 U.S.C. 154(b) by 175 days.

(21) Appl. No.: 14/912,781

(22) PCT Filed: Aug. 8, 2014

(86) PCT No.: PCT/EP2014/067064
§ 371 (c)(1),
(2) Date: Feb. 18, 2016

(87) PCT Pub. No.: WO2015/024797
PCT Pub. Date: Feb. 26, 2015

(65) Prior Publication Data
US 2016/0200134 A1 Jul. 14, 2016

(30) Foreign Application Priority Data
Aug. 19, 2013 (DE) .................. 10 2013 108 906

(51) Int. Cl.
*B42D 25/47* (2014.01)
*B42D 25/328* (2014.01)
(Continued)

(52) U.S. Cl.
CPC ............. *B42D 25/29* (2014.10); *B42D 25/41* (2014.10); *B42D 25/324* (2014.10);
(Continued)

(58) Field of Classification Search
CPC ............ B42D 2033/40; B42D 2033/42; B42D 25/47; B42D 25/328; G09F 2003/0277
(Continued)

(56) References Cited

U.S. PATENT DOCUMENTS 4,778,153 A * 10/1988 Bachman .............. G09F 3/0289
283/106
4,986,868 A 1/1991 Schmidt
(Continued)

FOREIGN PATENT DOCUMENTS

CN 1157595 8/1997
EP 0170712 A1 * 2/1986 ........... G09F 3/0292
(Continued)

*Primary Examiner* — Kyle R Grabowski
(74) *Attorney, Agent, or Firm* — Hoffmann & Baron, LLP

(57) ABSTRACT

A system (100, 200, 300, 400, 500, 600) for producing a security element (4), in particular a vignette for a windshield (6) of a means of transport, is specified. This comprises a carrier element (3) with a first and a second surface, wherein a first sub-element (1) of the security element (4) is arranged in a first area (31) of the first surface and a second sub-element (2) of the security element (4) is arranged in a second area (32) of the first surface separated from the first area (31) by a fold edge (33). These sub-elements (1, 2) can be made to overlap with the first sub-element (1) by folding of the carrier element (3) along the fold edge (33) and can be adhered by means of an adhesive (25) arranged on the side of the second sub-element (2) facing away from the carrier element (3). An individualization feature (14) can be attached to a side of the first (1) and/or the second (2) sub-element facing away from the carrier element (3). Furthermore, a method for producing a security element (4) by means of such a system (100, 200, 300, 400, 500, 600), as well as a security element (4) obtained thereby, is specified.

50 Claims, 7 Drawing Sheets

(51) Int. Cl.
*B42D 25/29* (2014.01)
*B42D 25/41* (2014.01)
*B42D 25/324* (2014.01)

(52) U.S. Cl.
CPC ............ *B42D 25/328* (2014.10); *B42D 25/47* (2014.10); *B42D 2033/10* (2013.01); *B42D 2033/18* (2013.01); *B42D 2033/22* (2013.01); *B42D 2033/24* (2013.01); *B42D 2033/26* (2013.01); *B42D 2033/40* (2013.01); *B42D 2035/20* (2013.01)

(58) Field of Classification Search
USPC .............................................. 283/81, 98, 106
See application file for complete search history.

(56) References Cited

U.S. PATENT DOCUMENTS

| | | | | |
|---|---|---|---|---|
| 5,318,326 | A * | 6/1994 | Garrison | B42D 25/47 283/109 |
| 5,916,665 | A * | 6/1999 | Fischer | B42D 25/00 428/195.1 |
| 6,019,395 | A * | 2/2000 | Souparis | G09F 3/0292 283/109 |
| 6,299,213 | B1 | 10/2001 | Souparis | |
| 6,514,587 | B1 * | 2/2003 | Fernandez-Kirchberger | B42D 25/47 283/106 |
| 6,623,042 | B1 | 9/2003 | Jurgen et al. | |
| 8,129,010 | B2 * | 3/2012 | Kobayashi | G09F 3/0288 283/100 |
| 2005/0001422 | A1 * | 1/2005 | O'Keefe | B42D 25/00 283/98 |
| 2005/0012326 | A1 * | 1/2005 | Keller | B42D 25/355 283/94 |
| 2005/0253375 | A1 | 11/2005 | Lesur | |
| 2008/0252067 | A1 * | 10/2008 | Souparis | B42D 15/008 283/94 |
| 2009/0324907 | A1 * | 12/2009 | D'Amato | B42D 25/00 428/195.1 |
| 2010/0230615 | A1 | 9/2010 | MacPherson et al. | |
| 2013/0134698 | A1 * | 5/2013 | Mayrhofer | B42D 25/47 283/81 |
| 2014/0333058 | A1 * | 11/2014 | Tremolada | B42D 25/00 283/81 |

FOREIGN PATENT DOCUMENTS

| | | | | |
|---|---|---|---|---|
| EP | 0733490 | 9/1996 | | |
| EP | 2465701 | 6/2012 | | |
| FR | 2843559 | 2/2004 | | |
| GB | 2128581 A | * | 5/1984 | ............ B42D 25/00 |
| JP | S50114297 | 9/1975 | | |
| JP | S6296672 | 6/1987 | | |
| JP | H07219435 | 8/1995 | | |
| JP | 2002366036 | 12/2002 | | |
| JP | 2004333530 | 11/2004 | | |
| JP | 2005513568 | 5/2005 | | |
| JP | 2008096693 | 4/2008 | | |
| WO | WO0102191 | 1/2001 | | |
| WO | WO2004096571 | 11/2004 | | |

* cited by examiner

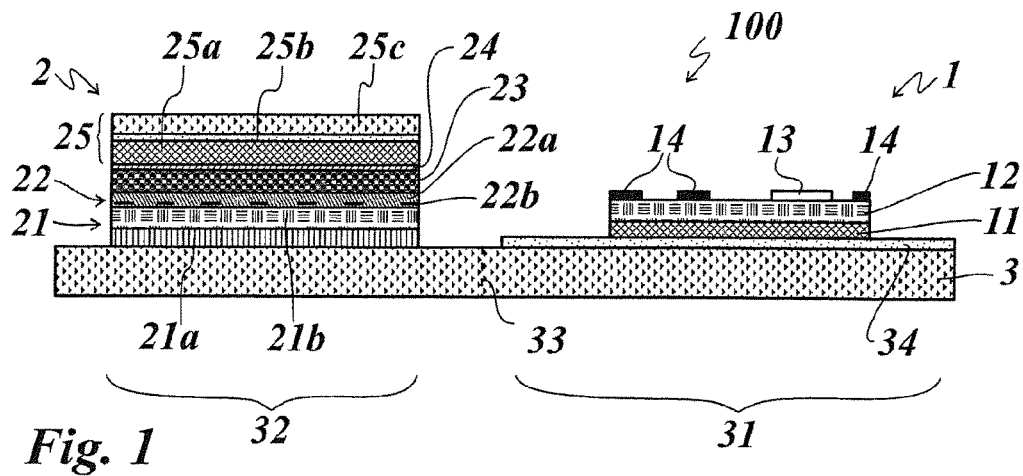
Fig. 1
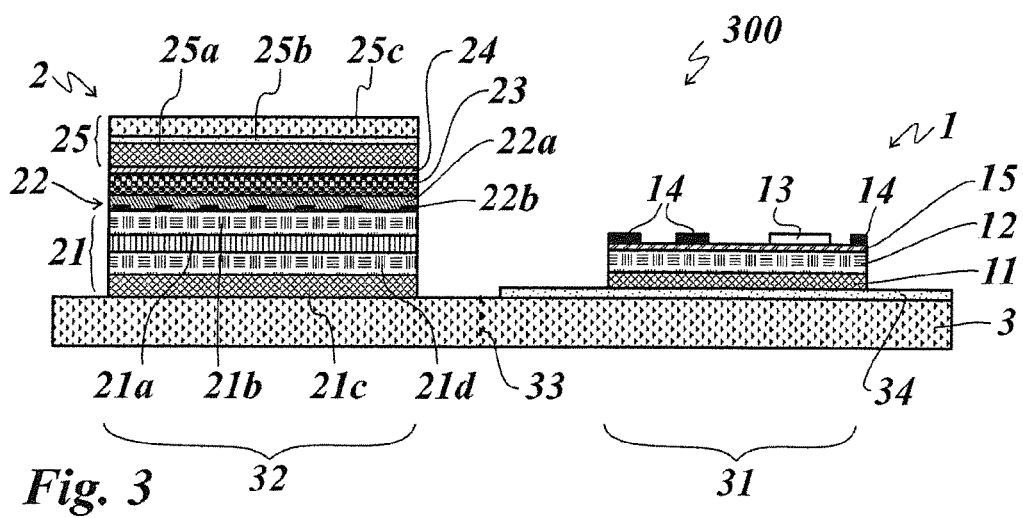
Fig. 2
Fig. 3

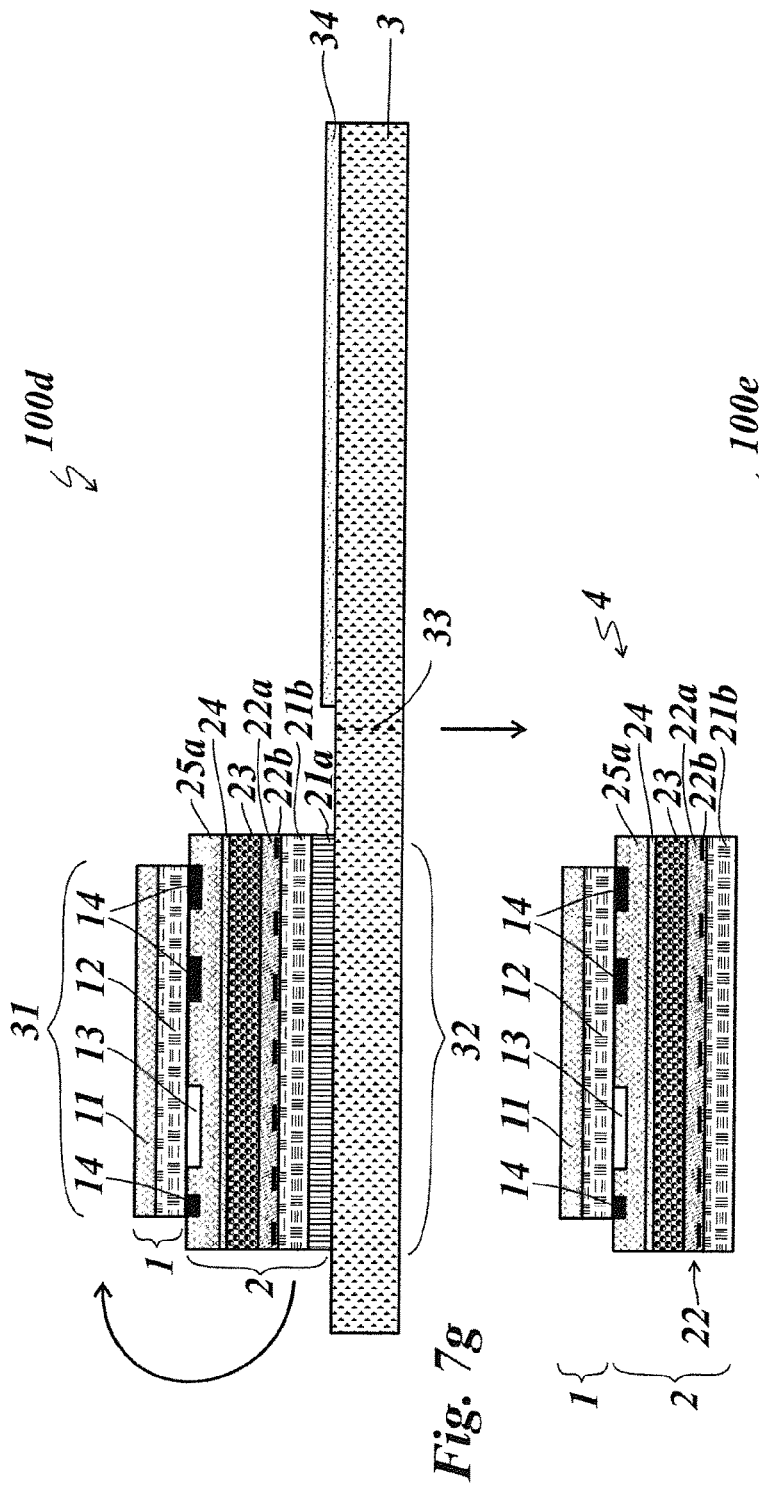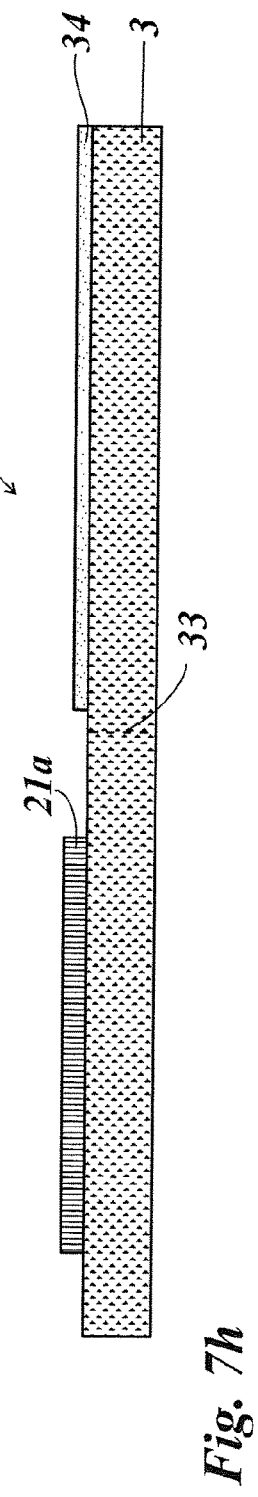
Fig. 7g
Fig. 7h

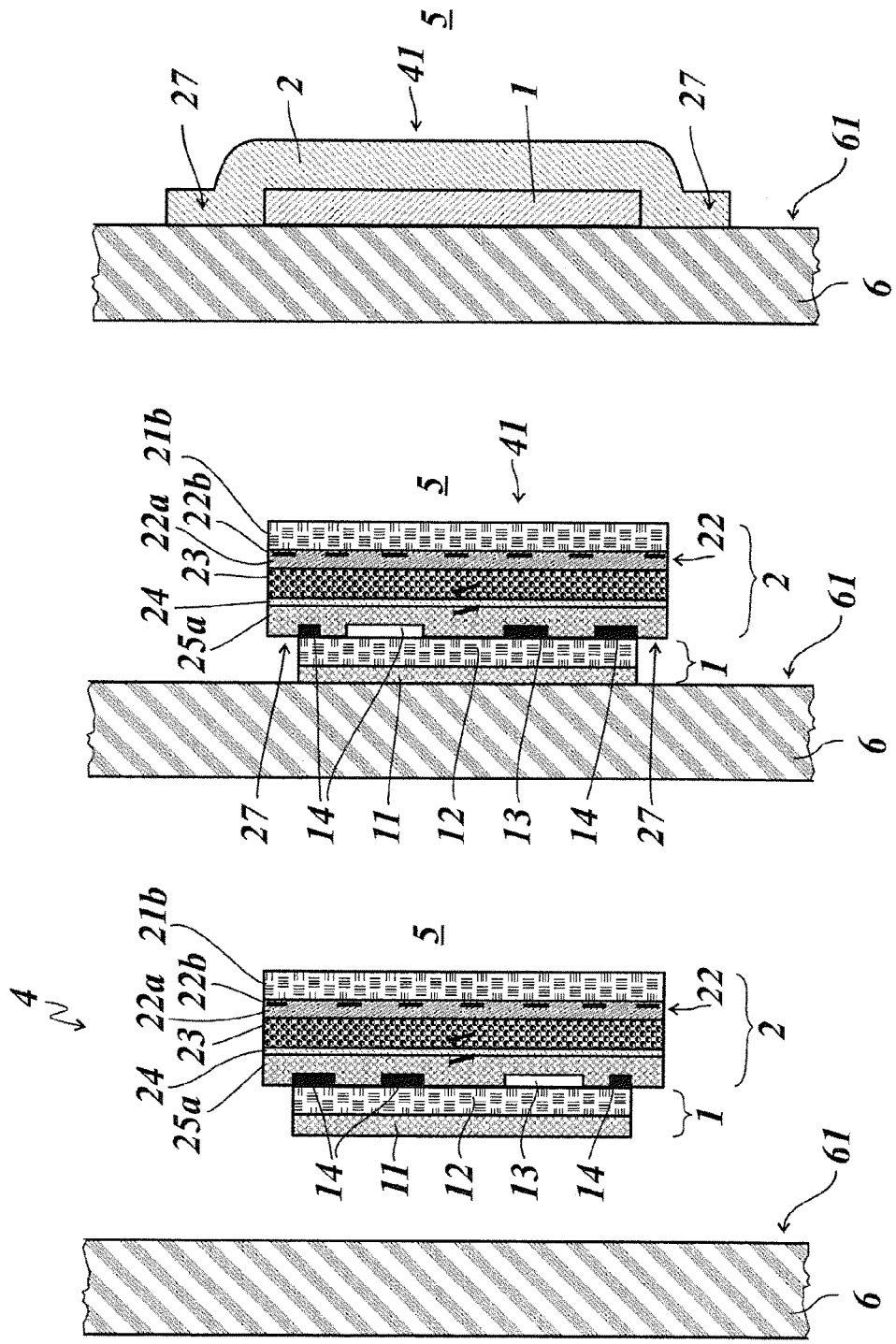

SYSTEM AND METHOD FOR PRODUCING AN INDIVIDUALIZED SECURITY ELEMENT

This application claims priority based on an International Application filed under the Patent Cooperation Treaty, PCT/EP2014/067064, filed on Aug. 8, 2014, and German Application No. DE 102013108906.2, filed on Aug. 19, 2013.

BACKGROUND OF THE INVENTION

The invention relates to a system for producing an individualized security element, a method for individualizing such a security element using such a system, as well as a security element produced in this way, in particular a vignette affixed to a windshield of a means of transport.

To prove that a road toll has been paid, a permit for road traffic has been effected, or another authorization for the use of roads, bridges or the like exists, vignettes are often used, which are stuck to the windshield of a means of transport, for example an automobile. In addition, vignettes also allow identification of proprietors and owners of vehicles and serve as protection against theft. In addition to motor vehicles, other means of transport can also be provided with such vignettes for the named purposes.

There are many requirements for such vignettes. Firstly, it must be possible to easily check that the vignette is authentic, i.e. is not a forgery. Furthermore, it is desirable for it to be impossible to detach such a vignette from the windshield of one means of transport and transfer it to the windshield of another means of transport, with the result that the vignette cannot be improperly used for several means of transport. In order to prevent such a misuse, it is additionally expedient to individualize the vignette, i.e. for example to mark it with the registration mark of the allocated vehicle. Such an individualization must be easy to attach, but at the same time must not be accessible for manipulations.

SUMMARY OF THE INVENTION

The object of the present invention is therefore to provide a system and method for producing a vignette that is particularly secure against forgery and manipulation, as well as easy to individualize.

This object is achieved by a system for producing a security element, in particular a vignette for a windshield of a means of transport, which system comprises a carrier element with a first and a second surface, wherein a first sub-element of the security element is arranged in a first area of the first surface and a second sub-element of the security element is arranged in a second area of the first surface separated from the first area by a fold edge, which second sub-element can be made to overlap with the first sub-element by folding of the carrier element along the fold edge, wherein the second sub-element has an adhesive which is arranged on the side of the second sub-element facing away from the carrier element, and wherein an individualization feature can be attached to a side of the first and/or the second sub-element facing away from the carrier element.

The object is furthermore achieved by a method for individualizing a security element, in particular a vignette for a windshield of a means of transport, which comprises the following steps:

a) providing a system for producing a security element as described above;

b) attaching an individualization feature to a side of the first sub-element and/or the second sub-element facing away from the carrier element;

c) folding the carrier element along the fold edge, wherein the sub-elements are made to overlap with each other d) adhering the sub-elements by means of an adhesive arranged on the side of the second sub-element facing away from the carrier element.

By means of transport in the following is meant in particular vehicles, in particular land vehicles, such as for example motor vehicles, heavy goods vehicles, two-wheelers, sleighs or the like, water vehicles, such as for example ships, boats, jet skis, submarines or the like, as well as aircraft and spacecraft, such as for example airplanes, helicopters, balloons, gliders or the like.

Such a system or method allows security elements to be individualized outside of the actual production process. The system itself can thus be manufactured industrially and then, for example, delivered to vignette issuing offices. Then the individualization feature, for example the registration of the means of transport for which the vignette is intended, is applied in the issuing office only when an individual vignette is issued. This can occur for example by printing, in particular by printing processes such as inkjet printing, thermal transfer printing or xerography (laser printing). Through the subsequent adhesion of the sub-elements, the individualization feature is enclosed in the layer structure of the sub-elements and is no longer accessible from the outside. Later manipulations of the individualization feature are thus no longer possible non-destructively, with the result that an improper use of the vignette, for example for another means of transport, can no longer be effected. A possibility is thus created for individualizing security elements such as vignettes in a particularly easy and at the same time tamperproof manner.

The first and/or the second sub-element preferably comprises at least one replication layer into which at least one relief structure is molded. It is particularly advantageous if the replication layer has a layer thickness of from 0.2 to 20 µm, preferably from 0.5 to 5 µm and particularly preferably from 0.5 to 2.5 µm.

Replication layers with such relief structures can be produced with precision only at considerable expense. This results in a particularly high degree of security against forgery.

By a replication layer is generally meant a layer that can be produced with a relief structure on the surface. This includes for example organic layers such as plastic or varnish layers or inorganic layers such as inorganic plastics (e.g. silicones), semi-conductor layers etc., but also combinations thereof. It is preferred that the replication layer is formed as a replication varnish layer. To form the relief structure, a radiation-curable or heat-curable (thermosetting) replication layer or a thermoplastic, in particular thermally drying, replication varnish layer can be applied, a relief can be molded into the replication layer and the replication layer can optionally be hardened with the relief imprinted therein.

The at least one relief structure is preferably formed as an in particular one- or two-dimensional diffractive grating structure, in particular with a spatial frequency of between 100 lines/mm and 4000 lines/mm, preferably between 1000 lines/mm and 2000 lines/mm.

It is expedient if the at least one relief structure is formed by one or more relief structures, selected from: light-diffracting and/or light-refracting and/or light-scattering and/or light-focusing micro- or nanostructures, isotropic or anisotropic mat structures, binary or continuous Fresnel lenses, microprism structures, blazed gratings with a spatial frequency of between 100 lines/mm and 1500 lines/mm, achromatic grating structures with spatial frequencies of between 50 lines/mm and 300 lines/mm, zero-order diffraction structures, in particular with a spatial frequency of between 2500 lines/mm and 4000 lines/mm, microlens arrays, in particular with a diameter of the microlenses of between 5 µm and 50 µm, and structures combining these.

Through such structures, various optical effects can be presented which both ensure an attractive appearance and increase the security against forgery.

The first and/or the second sub-element preferably has at least one reflective layer, in particular a metal layer or an HRI layer. Such layers can create an optical background and/or an optically active boundary layer for a replication layer and thus modify their reflective or refractive properties. The at least one reflective layer is thus preferably attached to the at least one surface of the replication layer provided with a relief structure. However, even taken by itself, it can serve to present optical effects. Aluminum, copper, gold, silver, chromium or an alloy of these metals is preferably used as metal for the metal layers. By an HRI layer is meant a layer made of a material with a high refractive index (HRI="High Refractive Index"). This can be for example zinc sulphide, or titanium dioxide. Furthermore, thin-layer systems with a sequence of layers with different refractive indices are also possible, for example a layer packet made of an HRI layer, followed by an LRI layer (LRI="Low Refractive Index"), and a further HRI layer. For example magnesium fluoride can be used as LRI layer.

The at least one reflective layer is advantageously patterned, in particular molded in the form of a first item of optical information. Such a reflective layer can be used to generate optical effects and in particular as an additional security element.

The first and/or the second sub-element can also have two or more different reflective layers, which are formed in particular from different metallic materials, and which are molded in particular in the form of different first items of optical information.

Precisely when an optical impression or an item of optical information is formed first by the interaction of two or more layers, a particularly good security against forgery is achieved, as the desired optical impression only forms when the interacting layers are arranged precisely registered, i.e. registration-accurate or register-accurate, relative to each other, which can be achieved only with difficulty in the event of forgeries.

The term "registration accuracy" or "register accuracy" originates from printing technology. There, registration marks or register marks are used which are applied to different layers or plies. Using these registration marks or register marks, it is very easily possible to set the exact relative positional accuracy of the plies or layers relative to each other and thus achieve a so-called registration accuracy or register accuracy. "Registered" thus means that the respective plies or layers are aligned sufficiently precisely positionally accurate relative to each other using the registration marks or register marks. These concepts are used in this sense in the following. In other words, it is a question of aligning layers lying one on top of another as accurately relative to each other as possible and arranging them "registered".

Further, in the at least one reflective layer, at least one transparent window is preferably provided in which the material of the reflective layer is not provided. The individualization feature is preferably arranged in this window later.

The reflective layer expediently has a layer thickness of from 0.005 µm to 2 µm, preferably from 0.01 µm to 0.2 µm and particularly preferably from 0.02 µm to 0.1 µm.

The first and/or the second sub-element preferably comprises at least one partial optically variable layer and/or one optically variable layer system. This layer or layer system has at least one lateral dimension smaller than the first or the second sub-element and thus covers the adjoining layer of the first or the second sub-element only in areas. The layer or layer system is preferably formed such that it contains at least one substance, in particular in dissolved form or in particulate or pigment form, with an optical effect that differs depending on the angle of view and/or comprises at least one liquid crystal layer with an optical effect that differs depending on the angle of view and/or a thin-film layer stack with an interference color effect dependent on the angle of view and/or a replication layer with a molded relief structure which has in particular the above-described formation.

With such optical effects that differ depending on the angle of view, additional security features can be implemented. Thus, for example—also in interaction with further layers of the security element—a security feature for the authentication of the security element can be created, which is entirely visible only from a particular angle of view. This also increases the security against forgery.

It is further expedient if the first sub-element comprises a first adhesive layer, in particular for adhering the security element to the windshield of the means of transport, and if the first adhesive layer is arranged on the side of the first sub-element facing the carrier element, with the result that the finished security element can reliably be secured on its target substrate.

The first adhesive layer is preferably a cold adhesive layer, in particular with a layer thickness of from 1 µm to 40 µm, preferably from 5 µm to 25 µm and particularly preferably from 10 µm to 20 µm.

A detachment layer, in particular a silicone layer, is expediently arranged between the first sub-element and the carrier element. This allows an easy removal of the carrier element, wherein the first adhesive layer is exposed, with the result that the security element is easy to secure.

It is furthermore advantageous if the first sub-element comprises an in particular self-supporting polymer layer, for example made of or with polyester, in particular PET (polyethylene terephthalate), PVC (polyvinyl chloride), PP (polypropylene). This gives the first sub-element stability and can serve as a carrier for the individualization feature and optionally further security features. The polymer layer is preferably a self-supporting film.

This polymer layer preferably consists of polyester and has a layer thickness of from 6 to 125 µm, preferably from 6 to 75 µm and particularly preferably from 6 to 50 µm.

It is furthermore expedient if the first sub-element has a varnish layer, in particular an adhesion-promoter layer to increase the adhesion of the individualization feature, wherein the varnish layer is applied to the side of the polymer layer facing away from the carrier element. This embodiment is advantageous in particular if the individualization feature is printed on, with the result that a secure adhesion of the printing ink is ensured. This varnish layer can furthermore have a security print and/or locally differing properties of adhesion to the polymer layer, with the result that it is destroyed in the event of manipulation attempts.

Such layers can also be present on the side of the polymer layer facing the carrier element.

In order to further improve the security against forgery of the security element, the partial optically variable layer or layer system can be arranged on the side of the polymer layer facing away from the carrier element, in particular on the varnish layer, and the individualization feature can be applicable or applied in a common layer plane with the partial optically variable layer or layer system, in particular next to the layer or layer system. In interaction with the partial optically variable layer, for example, the individualization feature can form perceptible structures which can be used for the authentication of the security element.

It is furthermore expedient if the adhesives for the adhesion of the first and the second sub-element comprise a second adhesive layer, in particular a cold adhesive layer. This expediently has a layer thickness of from 1 μm to 40 μm, preferably from 5 μm to 25 μm and particularly preferably from 10 μm to 20 μm.

The adhesives preferably comprise a detachment layer, in particular a detachable, siliconized paper or film layer, which is applied to the second adhesive layer on the side facing away from the carrier element, and which in particular overhangs, at least in areas, the second adhesive layer lying under it. Such a detachment layer protects the system from unintentional incorrect adhesion and, because of the projection, is particularly easy to detach, when the adhesion is to be effected. The second adhesive layer is exposed by the detachment of the detachment layer. If the detachment layer is present without a projection, it is advantageous if it is not present continuously, but has punched holes for example. Thus, for example, the detachment layer separates at the punched holes by bending of the carrier element and the two sub-areas can be easily removed.

The paper or film layer expediently has a layer thickness of from 30 μm to 300 μm, preferably from 40 μm to 160 μm and particularly preferably from 60 μm to 120 μm.

The second sub-element preferably comprises a detachment layer for detaching the second sub-element from the carrier element. The second sub-element can thus also be easily separated from the carrier element, when the individualized security element is to be applied to its target substrate.

This detachment layer preferably has at least one polymer layer, in particular a polyester layer, with a layer thickness of from 6 μm to 125 μm, preferably from 6 μm to 75 μm and particularly preferably from 6 μm to 50 μm. One or more of the polymer layers can remain on the second sub-element when the detachment layer is detached or else can also be detached with it.

The detachment layer preferably comprises at least one UV adhesive layer. This expediently has a layer thickness of from 0.1 μm to 10 μm, preferably from 0.1 μm to 5 μm and particularly preferably from 0.2 μm to 2.5 μm. Such a UV adhesive layer can be easily detached from its substrate, in particular from one of the polymer layers. Through UV curing, it can be ensured that no adhesive effect remains after detachment of the detachment layer.

Furthermore, it is possible to modify the surface of the polymer layers such that adhesive systems, such as for example cold adhesives, that usually adhere well to the respective polymer, in particular to polyester, can be detached again. This can be effected for example by means of a siliconization of the polymer layers or with a thin detachment layer which is bound by means of a wax-based system.

Alternatively, the second sub-element can comprise at least one reversibly detachable adhesive layer. Such adhesive layers are known for example from sticky notes made of paper. Here, a layer thickness of from 1 μm to 40 μm, preferably from 5 μm to 25 μm and particularly preferably from 10 μm to 20 μm, is particularly expedient.

The UV adhesive layer or the reversibly detachable adhesive layer is particularly preferably arranged between two polymer layers. In the case of such an arrangement, one polymer layer remains on the carrier element and the other polymer layer remains on the second sub-element. This both makes it easier to detach the detachment layer and gives the second sub-element additional stability, through the remaining polymer layer.

It is further advantageous if the detachment layer extends beyond at least one further layer of the second sub-element in the surface plane of the carrier element in at least one direction. The detachment layer can be gripped on this projection during detachment of the second sub-element from the carrier element, with the result that the detachment is made easier.

The second sub-element preferably has at least one adhesion layer which has properties of adhesion to the adjoining layers that differ in areas and, in particular at the points where it is provided, increases or reduces the adhesion of the adjoining layers. Once the finally individualized security element has been applied to its target substrate, such an adhesion layer reliably prevents a destruction-free detachment of the security element from the target substrate, with the result that it cannot be improperly transferred for example to another means of transport.

The adhesion properties of the adhesion layer are set such that, in the event of a detachment attempt, in the area of higher inter-layer adhesion at least a part of the second sub-element is for example peeled off with the polymer layer and in the area of lower inter-layer adhesion the polymer layer detaches from the other layers of the second sub-element, whereby the security feature is destroyed. The areas of higher and of lower inter-layer adhesion can also be arranged such that they present an item of optical information which becomes visible in the event of such a detachment attempt. For example, a legend such as "INVALID" can become visible in the event of detachment.

This adhesion layer expediently comprises an adhesion-promoter layer. This can be for example an adhesive. The adhesion-promoter layer advantageously has a layer thickness of from 0.005 μm to 20 μm, preferably from 0.5 μm to 5 μm and particularly preferably from 0.5 μm to 2.5 μm.

Furthermore, it is preferably provided that the adhesion layer comprises a partial wax layer or a partial adhesive layer. Such a partial wax or adhesive layer can locally lower or increase the adhesion of the adhesion-promoter layer to adjoining layers, with the result that the desired local variation of the inter-layer adhesion is achieved, which results in the destruction of the security element in the event of an attempt to detach the finished security element from its target substrate.

The partial wax layer or adhesive layer advantageously has a layer thickness of from 0.002 μm to 1 μm, preferably from 0.005 μm to 0.2 μm and particularly preferably from 0.005 μm to 0.1 μm.

It is particularly expedient if the adhesion layer is arranged between the replication layer and the detachment layer. In the event of an attempt to detach the security element from its target substrate, the replication layer is inevitably damaged. This is immediately recognizable with reference to the damaged characteristic optical security features or optical effects of the replication layer. It is thus immediately obvious if a vignette is being improperly used for several means of transport.

The carrier element is preferably formed from transparent, translucent or opaque polymer, in particular polyester, preferably PET (polyethylene terephthalate). This makes it possible to illuminate possibly provided photosensitive layers, such as for example a UV varnish layer, through the carrier element. This is particularly advantageous if illumination is not possible through the further layers arranged on the side of the photosensitive layer facing away from the carrier element because these are not transparent for the necessary wavelength.

Such a carrier element made of polyester preferably has a layer thickness of from 25 µm to 250 µm, preferably from 50 µm to 150 µm and particularly preferably from 50 µm to 120 µm.

Alternatively, the carrier element can also be formed from paper, for example should illumination through the carrier element not be necessary.

In this case it is expedient if the carrier element has a layer thickness of from 30 µm to 300 µm, preferably from 40 µm to 160 µm and particularly preferably from 60 µm to 120 µm.

Furthermore, the first and/or the second sub-element can have a cut which extends from a surface of the respective sub-element facing away from the carrier element, perpendicularly to the plane of extension of the carrier layer, through at least one layer of the respective sub-element.

It is furthermore advantageous if the second sub-element has a larger extension width than the first sub-element in all directions situated in the plane of extension of the carrier element. When the finally individualized security element is affixed to its target substrate, the second sub-element then extends over the first sub-element, which is affixed to the target substrate, for example a windshield. The projecting area can then likewise be adhered to the target substrate.

The individualization feature is preferably applied by printing, in particular by printing processes such as inkjet printing or xerography (laser printing). Such an individualization can be carried out particularly easily and without a large technical outlay, for example it can be effected directly in the vignette issuing office. Furthermore, it is also possible to introduce an identification mark with a laser, for example altering a reflective layer or a color layer. This alteration can mean a local stripping (ablation) of the respective layer or a blackening, bleaching or another color change.

The individualization feature can also be applied indirectly, for example in the form of a separate label or another transfer element. For example, the label can be provided in particular with personalized or individualized items of information in a separate process and/or device, for example by printing processes such as inkjet printing or xerography (laser printing) or with a laser, for example altering a substrate layer, reflective layer or a color layer of the label. This alteration can mean a local stripping (ablation) of the respective layer or a blackening, bleaching or another color change. This printed label is then applied as individualization feature.

A serial number, a barcode, a name, a license plate number or the like is preferably applied as individualization feature. This makes possible, for example, direct allocation of the security element, in particular the vignette, to a specific means of transport or its owner.

When the individualized security element is being finished, preferably before the folding in step c), a detachment layer, in particular a siliconized paper layer, is detached from a surface of the second sub-element facing away from the carrier element and thus the adhesive layer of the adhesive comprising the detachment layer and the adhesive layer is exposed for the adhesion in step d).

The sub-elements are then preferably made to overlap such that the second sub-element protrudes beyond the first sub-element on all sides so, as described above, as to create a projecting edge which makes it possible for both sub-elements to be adhered to the target substrate. The side faces of the layer composite of the security element are additionally protected by the projecting edge, with the result that an undesired delamination can be prevented.

In a further step e), the carrier element is preferably detached from the adhered sub-elements. The individualized and adhered sub-elements now form the finished security element, which now only needs to be stuck to its target substrate.

Here, the carrier element is preferably detached from the first sub-element along a detachment layer, in particular a silicone layer, wherein an adhesive layer of the first sub-element is exposed, by means of which the security element can be adhered to a surface, in particular a windshield of a vehicle.

The detachment can be effected such that, in step e), the carrier element is detached from the second sub-element such that a detachment layer of the second sub-element separates such that an adhesive layer of the detachment layer remains on the carrier element and a polymer layer forms a surface of the security element.

The adhesive layer is preferably, as already described, a UV adhesive layer, cold adhesive layer or reversibly detachable adhesive layer.

BRIEF DESCRIPTION OF THE DRAWING

The invention is explained by way of example with reference to the drawings. There are shown in:

FIG. 1 a schematic sectional representation of a first embodiment example of a system for producing an individualized vignette;

FIG. 2 a schematic sectional representation of a second embodiment example of a system for producing an individualized vignette;

FIG. 3 a schematic sectional representation of a third embodiment example of a system for producing an individualized vignette;

FIGS. 7a-j a schematic sectional representation using an embodiment example of a system for producing an individualized vignette while a method for producing the vignette is being carried out;

FIG. 8 a schematic sectional representation of a finished vignette applied to a windshield.

DETAILED DESCRIPTION OF THE INVENTION

Figure 4:
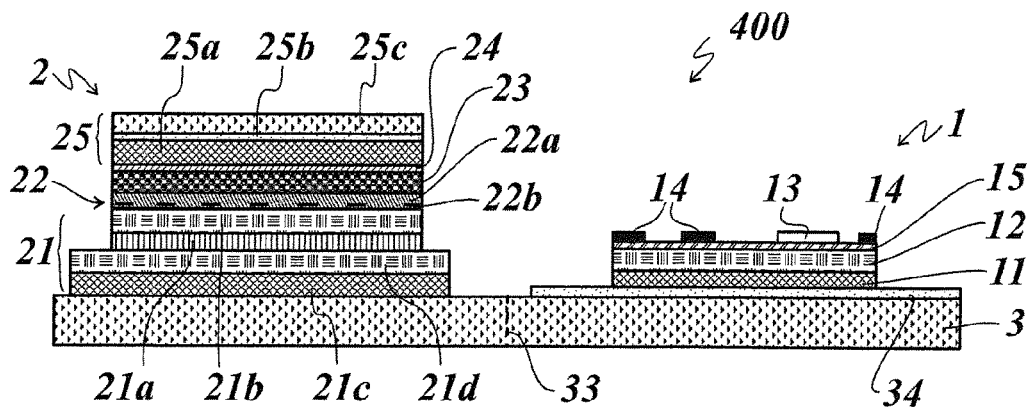
FIG. 4 a schematic sectional representation of a fourth embodiment example of a system for producing an individualized vignette.

A system 100 for producing a personalized vignette for a means of transport comprises a first sub-element 1 and a second sub-element 2, which are in each case arranged on a carrier element 3. The carrier element 3 has a fold edge 33 between the areas 31 and 32 of the carrier element, on which the sub-elements 1, 2 are arranged in each case. In the area 31 of the carrier element 3, on which the first sub-element 1 is arranged, the carrier element 3 is provided, on its surface facing the sub-element 1, with a detachment layer 34, which is preferably formed as a silicone layer.

The first sub-element 1 is joined to the detachment layer 34 with a cold adhesive layer 11. In the direction away from the carrier element 3, the cold adhesive layer 11 is followed by a polymer layer 12, for example made of or with polyester, in particular PET (polyethylene terephthalate), PVC (polyvinyl chloride) or PP (polypropylene), on the surface of which a partial optically variable layer 13 and, in the same layer plane, a printed-on individualization feature 14 are provided, wherein the individualization feature 14 and the partial optically variable layer 13 can at least partially overlap.

The second sub-element 2 is secured to the same side of the carrier element as the first sub-element 1 with a detachment layer 21. The detachment layer 21 comprises a UV adhesive layer 21a on the side facing the carrier element 3. This is adjoined, in the direction away from the carrier element 2, by a polymer layer 21b. The detachment layer 21 is followed by an adhesion layer 22, which comprises an adhesion-promoter layer 22a and a partial wax layer 22b. This is adjoined by a replication layer 23 and a reflective layer 24. Towards the outside, thus towards its side facing away from the carrier element 3, the second sub-element 2 is sealed by the adhesives 25. These comprise a cold adhesive layer 25a and a detachment layer, which is formed in particular by a silicone layer 25b and a paper layer 25c. The cold adhesive layer 25a is exposed by peeling off the paper layer 25c and the silicone layer 25b. To finish the vignette, the carrier element 3 can then be folded at the fold edge 33, with the result that the first sub-element 1 comes to lie on the second sub-element 2 and the sub-elements 1,2 are adhered by the cold adhesive layer 25a, as will be explained in detail later.

The first sub-element 1 can be detached from the carrier element 33 along the detachment layer 34. This exposes the cold adhesive layer 11, which is used to adhere the finished vignette to a windshield of a vehicle. The cold adhesive layer preferably has a layer thickness of from 1 to 40 µm, preferably from 5 to 25 µm and particularly preferably from 10 to 20 µm. Adhesive based on acrylates, polyesters or polyolefins is particularly suitable as adhesive material.

The polymer layer 12 is preferably a self-supporting film made of PET (polyethylene terephthalate), gives the first sub-element 1 stability and provides a surface for application of the partial optically variable layer 13 and the individualization feature 14. The layer thickness of the polymer layer 12 is 6 µm to 125 µm, preferably from 6 µm to 75 µm and particularly preferably from 6 µm to 50 µm. The polymer layer 12 is preferably transparent, in order to make possible an unobstructed view of the optically variable layer 13 and the individualization feature 14.

The partial optically variable layer 13 serves as a security feature which makes forgeries of the vignette difficult. The layer 13 can also be constructed as a layer system. In particular, the partial optically variable layer 13 can comprise at least one substance, in particular in dissolved form or in particulate or pigment form, with an optical effect that differs depending on the angle of view and/or at least one liquid crystal layer with an optical effect that differs depending on the angle of view and/or a thin-film layer stack with an interference color effect dependent on the angle of view and/or a replication layer with a molded relief structure. Furthermore, it can contain a security print, for example complex line patterns printed in high resolution, such as one or more guilloches.

The latter can in turn comprise light-diffracting and/or light-refracting and/or light-scattering and/or light-focusing micro- or nanostructures, isotropic or anisotropic mat structures, binary or continuous Fresnel lenses, microprism structures, blazed gratings with a spatial frequency of between 100 lines/mm and 1500 lines/mm, achromatic grating structures with spatial frequencies of between 50 lines/mm and 300 lines/mm, zero-order diffraction structures, in particular with a spatial frequency of between 2500 lines/mm and 4000 lines/mm, microlens arrays, in particular with a diameter of the microlenses of between 5 µm and 50 µm, as well as structures combining these. With such structures, optical effects can be created which are only visible from a particular angle of view or change depending on the angle of view. It is also possible to design these effects such that they present a complete item of optical information, which in turn is only recognizable depending on the angle of view, only in cooperation with the individualization feature. This also contributes to an increased security against forgery.

The individualization feature 14 can be applied in the same layer plane as the partial optically variable layer 13. This can be effected in particular independently of the manufacture of the rest of the constituents of the system 100. For example, the system 100 can be manufactured and delivered to vignette issuing offices without the individualization feature 14. If a vehicle owner purchases such a vignette, the individualization feature 14 is applied to the polymer layer 12 directly in the issuing office, for example by means of an inkjet, thermal transfer or laser printer. Furthermore, it is possible to introduce an item of information by means of a laser, for example by local stripping (ablation) of one or more layers or a blackening, bleaching or another color change of a layer. It is thus possible to allocate the vignette to the vehicle owner immediately, for example by applying the registration mark of the allocated vehicle as individualization feature 14. The name of the vehicle owner, validity dates of the vignette, or specific sections of road for which the vignette is to be valid, can also be constituents of the individualization feature. After the sub-elements 1, 2 have been assembled, the individualization feature is then enclosed between the polymer layer 12 of the first sub-element 1 and the cold adhesive layer 25a of the second sub-element 2 and thus protected from manipulations.

The second sub-element 2 is joined to the area 32 of the carrier element 3 by means of a detachment layer 21. The joining is facilitated by a UV adhesive layer 21a, which has a layer thickness of from 0.1 µm to 10 µm, preferably from 0.1 µm to 5 µm and particularly preferably from 0.2 µm to 2.5 µm. A further constituent of the detachment layer 21 is a polymer layer 21b with a layer thickness of from 6 µm to 125 µm, preferably from 6 µm to 75 µm and particularly preferably from 6 µm to 50 µm. After a radiation curing of the UV adhesive layer 21a, this is joined securely to the carrier element 3, but the join to the polymer layer 21b remains detachable. When the finished vignette is peeled off the carrier element 3, the UV adhesive layer 21a thus remains on the carrier element 3 and the polymer layer 21b remains on the vignette and contributes to its stability.

The adhesion layer 22 adjoining towards the outside comprises an adhesion-promoter layer 22a with a layer thickness of from 0.005 µm to 20 µm, preferably from 0.5 µm to 5 µm and particularly preferably from 0.5 µm to 2.5

μm and a partial wax layer 22b with a layer thickness of from 0.002 μm to 1 μm, preferably from 0.005 μm to 0.2 μm and particularly preferably from 0.005 μm to 0.1 μm. Through the partial wax layer 22b, which inhibits the contact of the adhesion-promoter layer 22a with the polymer layer 21b in areas, the inter-layer adhesion between the replication layer 23 situated further out and the polymer layer 21b is modulated in sections, i.e. a different inter-layer adhesion prevails in different areas. This fulfills a further security function. If an attempt is made to detach a finished vignette already secured to the windshield again, in order to use it improperly in another means of transport, then the areas of the replication layer 23 covered by the partial wax layer 22b detach from the polymer layer 21b first, while the uncovered areas are held together by the adhesion-promoter layer. This results in damage to the optical features and optical effects of the replication layer 23, with the result that such a manipulation can be recognized immediately. In particular acrylates, polyester, nitrocellulose and mixtures thereof are suitable as material for the adhesion-promoter layer 22a, while the wax layer 22b preferably consists of polyolefins, cellulose esters or cellulose ethers and mixtures thereof.

The replication layer 23 adjoining the adhesion layer towards the outside, i.e. from the carrier element 3, has a layer thickness of from 0.2 μm to 20 μm, preferably from 0.5 μm to 5 μm and particularly preferably from 0.5 μm to 2.5 μm and has at least one relief structure, which can be introduced into the replication layer 23 for example by means of an embossing roller. The relief structure can be a one- or two-dimensional diffractive grating structure. This preferably has a spatial frequency of between 100 lines/mm and 2500 lines/mm, preferably between 1000 lines/mm and 2000 lines/mm. In order to achieve particular optical effects, the relief structure can have light-diffracting and/or light-refracting and/or light-scattering and/or light-focusing micro- or nanostructures, isotropic or anisotropic mat structures, binary or continuous Fresnel lenses, microprism structures, blazed gratings with a spatial frequency of between 100 lines/mm and 300 lines/mm, zero-order diffraction structures, in particular with a spatial frequency of between 2500 lines/mm and 4000 lines/mm, microlens arrays, in particular with a diameter of the microlenses of between 5 μm and 50 μm, and structures combining these. Because of the high precision necessary for their production, such structures are used as security elements which can be forged only with difficulty.

The optical effect of the replication layer 23 forms in particular in cooperation with the reflective layer 24 adjoining towards the outside. This has a layer thickness of from 0.005 to 2 μm, preferably from 0.01 to 0.2 μm and particularly preferably from 0.02 to 0.1 μm. Metals such as aluminum, silver, copper, chromium or gold, as well as HRI materials (HRI=High Refractive Index), thus materials with a high refractive index, such as for example titanium dioxide, or zinc sulphide, are suitable as material for the reflective layer. Combinations of these materials can also be used. Particular optical effects can be achieved if the reflective layer 24 is not continuous, but is applied in a pattern. Such patterns can be complemented for example by the structures of the replication layer 23 and in their entirety reveal the desired image. Several patterns made of different materials can also be formed in the reflective layer 24. Precisely several, complementary patterns within the reflective layer 24 or between the reflective layer 24 and the replication layer 23 considerably increase the security against forgery of the vignette, because of the register accuracy necessary for the production.

The second sub-element 2 is sealed by adhesives 25 on its side facing away from the carrier element 3. These comprise a cold adhesive layer 25a which lies on the reflective layer 24. Towards the outside the cold adhesive layer 25a is protected by a paper layer 25c, which can be peeled off the cold adhesive layer 25a because of an intermediate silicone layer 25b.

The cold adhesive layer 25a preferably consists of acrylates and has a layer thickness of from 1 μm to 40 μm, preferably from 5 μm to 25 μm and particularly preferably from 10 μm to 20 μm. The paper layer 25c has a layer thickness of from 30 μm to 300 μm, preferably from 40 μm to 160 μm and particularly preferably from 60 μm to 120 μm and preferably projects laterally beyond the cold adhesive layer 25a, with the result that a tab for easily peeling off the paper layer 25c is formed.

Alternatively, punched holes can also be provided in the paper layer 25c, in order that the paper layer separates at the punched holes by bending of the carrier and can be easily peeled off. After the paper layer 25c has been peeled off, wherein the silicone layer 25b remains on the paper layer 25c, the cold adhesive layer 25a is exposed, with the result that, by folding of the carrier element at the fold edge 33, the two sub-elements 1, 2 are made to overlap and can be adhered. The second sub-element is preferably larger than the first, with the result that an edge of the cold adhesive layer 25a preferably protruding on all sides remains. When the finished vignette is affixed to the windshield, the first sub-element 1 is then joined to the windshield by means of the cold adhesive layer 11, while the protruding edge of the cold adhesive layer 25a likewise joins the second sub-element 2 to the windshield, with the result that a particularly good hold is achieved.

The carrier element 3 preferably likewise consists of polyester, in particular of a self-supporting film made of PET (polyethylene terephthalate), and is in particular transparent, translucent or opaque, with a layer thickness of from 25 μm to 250 μm, preferably from 50 μm to 150 μm and particularly preferably from 50 μm to 120 μm. This makes it possible to illuminate the UV adhesive layer 21a through the carrier element 3, in order to harden the UV adhesive.

In the following, further embodiments of the described system 100 are described. Identical constituents are labeled with identical reference numbers and have the properties and functions already described with reference to the system 100.

FIG. 2 shows an alternative system 200 for producing an individualized vignette. The system 200 corresponds in all components to the system 100 and merely has one additional varnish layer 15, which is arranged between the polymer layer 12 and the partial optically variable layer 13, as well as the individualization feature 14 of the first sub-element 1. This varnish layer improves the adhesion of the individualization feature 14 or of the partial optically variable layer 13. In particular PVC (polyvinyl chloride) is suitable as material for the varnish.

The alternative system 300 represented in FIG. 3, like the system 200, comprises a varnish layer 15 for improving the adhesion of the individualization feature 14. It additionally differs from the system 200 in the structure of the detachment layer 21 and of the carrier element 3.

In this embodiment example the carrier element 3 consists of paper with a layer thickness of from 30 to 300 μm, preferably from 40 to 160 μm and particularly preferably from 60 to 120 μm. An illumination of the UV adhesive layer 21a through the carrier element 3 is thus not possible here, the illumination has to be effected from the other side of the second sub-element 2. This embodiment is therefore only possible if the further layers of the second sub-element 2 have a sufficient transmittance for UV radiation of the wavelength necessary for the illumination of the UV adhesive layer 21*a*.

In order to make a reliable detachment of the second sub-element 2 from the carrier element 3 possible, the detachment layer 21 is modified in this embodiment example.

The detachment layer now comprises a cold adhesive layer 21*c*, with which the second sub-element 2 is firmly secured to the carrier element 3. Towards the outside this is adjoined by a further polymer layer 21*d*, which is then followed by the already described layer structure of a UV adhesive layer 21*a* and a polymer layer 21*b*. When the second sub-element 2 is detached from the carrier element, the join between the UV adhesive layer 21*a* and the polymer layer 21*b* dissolves. Only the polymer layer 21*b* remains, as in the already described embodiment examples, on the second sub-element 2. The UV adhesive layer 21*a*, the further polymer layer 21*d* and the cold adhesive layer 21*c* remain on the carrier element.

The system 400 shown in FIG. 4 again corresponds to the system 300. The only difference is that the cold adhesive layer 21*d* and the further polymer layer 21*d* of the detachment layer 21 of the second sub-element have a larger surface area than the rest of the layers. This makes the detachment easier and does not result in an alteration of the finished vignette, as the wider layers 21*c* and 21*d*, as described, remain on the carrier element 3.

Figure 5:
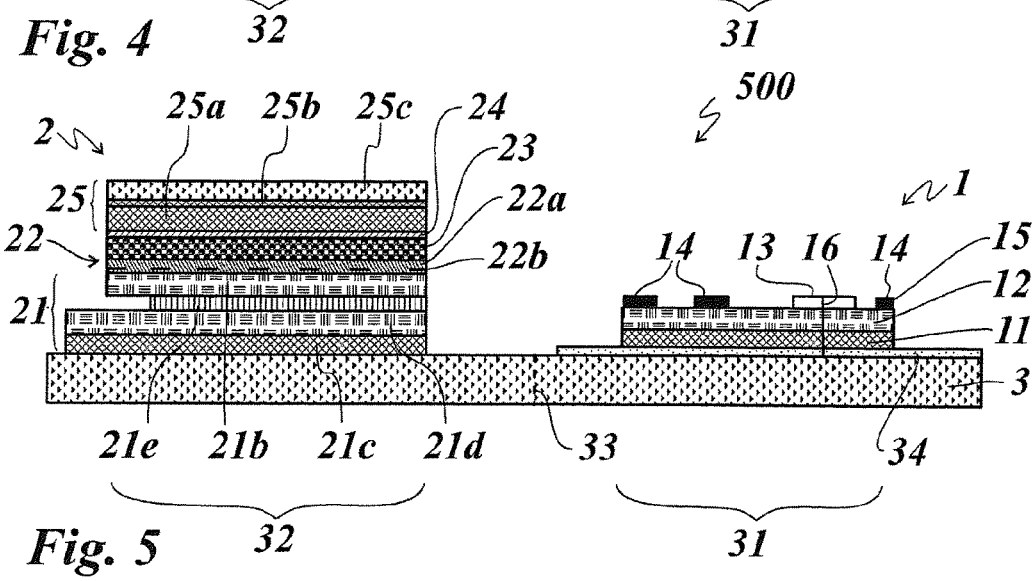
FIG. 5 a schematic sectional representation of a fifth embodiment example of a system for producing an individualized vignette.

The system 500 according to FIG. 5 is derived from the system 300 according to FIG. 3. Instead of a UV adhesive layer 21*a*, a reversibly detachable adhesive layer 21*e*, which does not require radiation curing and can for example be easily printed on, is provided in the second sub-element. In particular formulations based on polyvinyl alcohol are suitable as adhesive. The layer thickness of the adhesive layer 21*e* is 1 to 40 µm, preferably 5 to 25 µm and particularly preferably 10 to 20 µm. As the carrier element 3 also consists of paper here, an illumination through the carrier element 3 is not possible. The use of the reversibly detachable adhesive for the adhesive layer 21*e* makes it possible to use the system 500 now even if illumination is also not possible from the top side of the second sub-element 2. As in the system 300, when the second sub-element is detached only the polymer layer 21*b* remains on the second sub-element 2, while the adhesive layer 21*e*, the further polymer layer 21*d* and the cold adhesive layer 21*c* remain on the carrier element.

The reversibly detachable adhesive layer 21*e* need not extend over the whole width of the second sub-element. If, as can be seen in the figure, a slight projection remains, the detachment is made easier.

Furthermore, the system 500 can also comprise cuts 16, 26 in the first 1 and/or the second 2 sub-element, which extend through at least one layer of the respective sub-element 1, 2. This contributes to the destruction of the security features in the event of improper detachment of an already attached vignette.

A varnish layer 15 is not provided here, but can also be used.

Furthermore, it is possible to modify the surface of the polymer layers such that adhesive systems that usually adhere well to polyester, such as for example cold adhesives, can be detached again. This can be effected for example by means of a siliconization or with a thin detachment layer, which is bound on by means of a wax-based system.

Figure 6:
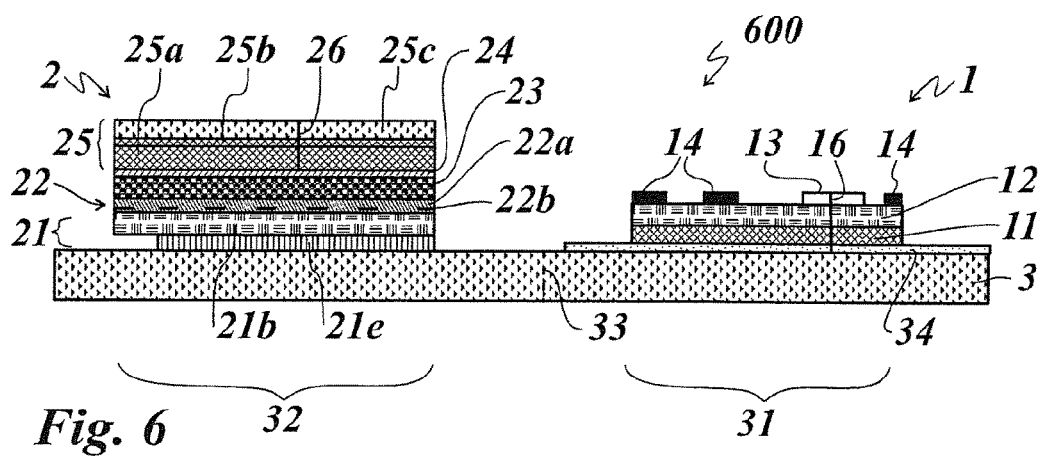
FIG. 6 a schematic sectional representation of a sixth embodiment example of a system for producing an individualized vignette.

The system 600 according to FIG. 6 corresponds to the system 500. The only difference is that the cold adhesive layer 21*c* and the further polymer layer 21*d* in the detachment layer 21 of the second sub-element 2 have been dispensed with. This is possible because the reversibly detachable adhesive layer 21*e* used here, unlike the UV adhesive layer 21*a*, can also be applied to the paper of the carrier element 3 problem-free. There are no further differences from the system 500.

The production steps for a complete individualized vignette starting from a system 100 according to FIG. 1 are represented in FIG. 7. As FIG. 7*a* shows, the system 100 is first provided and printed with the individualization feature 14 in the described manner. Then the paper layer 25*c* of the adhesive 25 of the second sub-element 2 is peeled off together with the silicone layer 25*b* in the direction of the arrow.

Figure 7A:
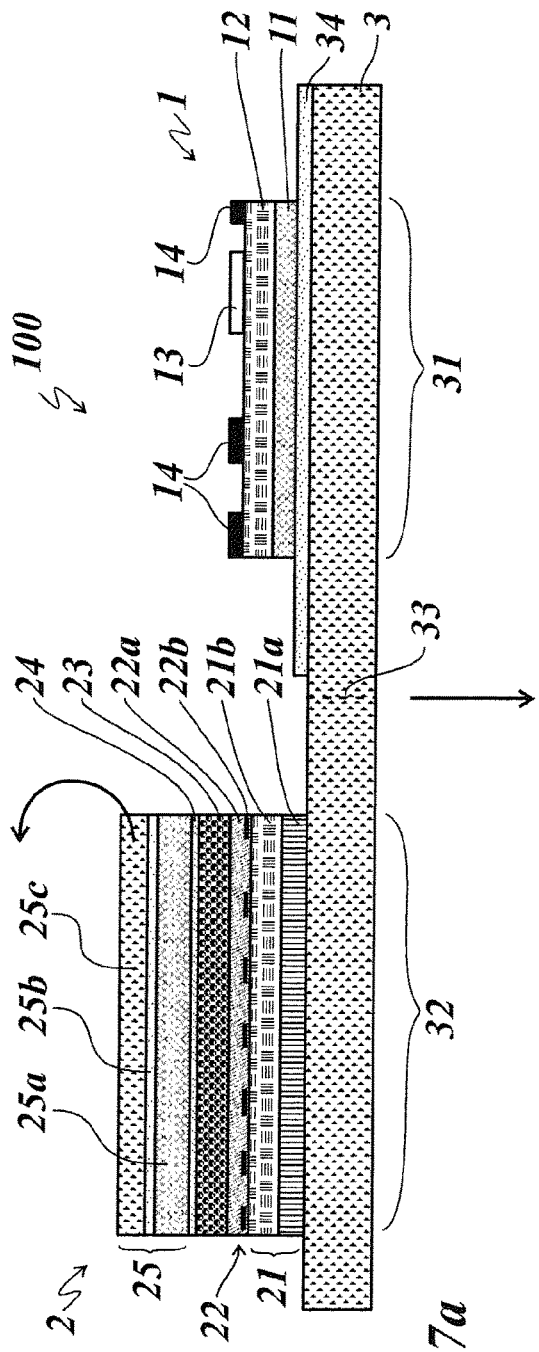
Figure 7B:
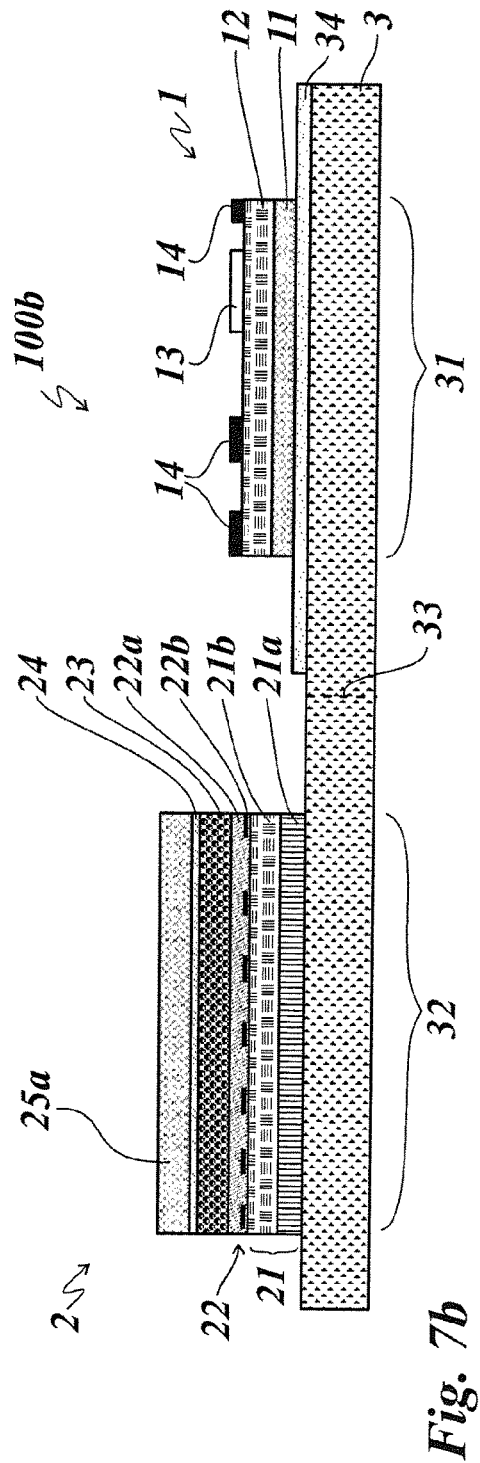
Figures 7C, 7D:
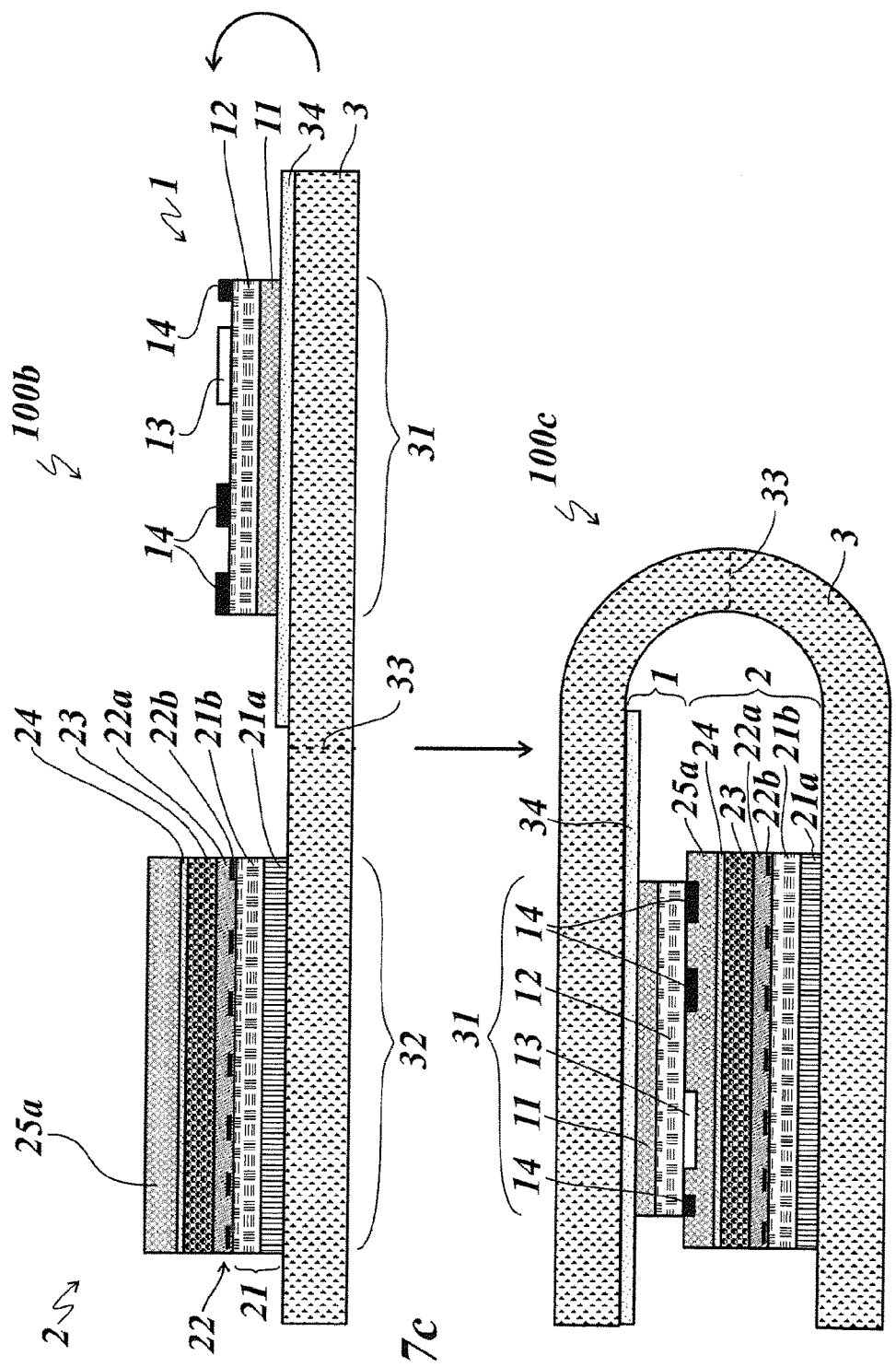

The intermediate product 100*b* shown in FIG. 7*b*, in which the cold adhesive layer 25*a* of the adhesive 25 of the second sub-element 2 is exposed, is thus obtained. As represented in FIG. 7*c*, the carrier element 3 of the intermediate product 100*b* is now folded in the direction of the arrow via the fold edge 33. The intermediate product shown in FIG. 7*d* forms here. Polymer layer 12, partial optically variable layer 13 and individualization feature 14 of the first sub-element 1 now lie on the cold adhesive layer 25*a* of the second sub-element, with the result that the sub-elements 1, 2 are adhered. The individualization feature 14 is now enclosed between the polymer layer 12 and the cold adhesive layer 25*a* so as to be secure against manipulation.

Figure 7E:
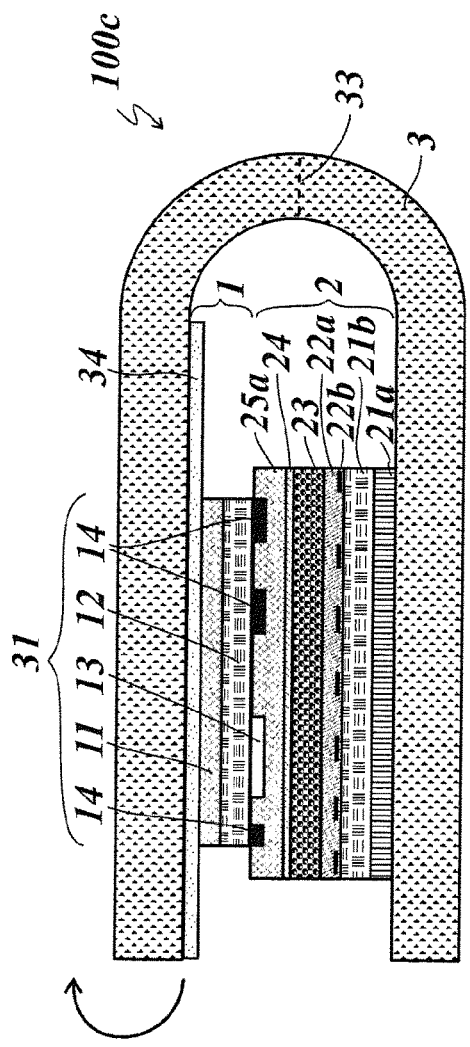
Figure 7F:
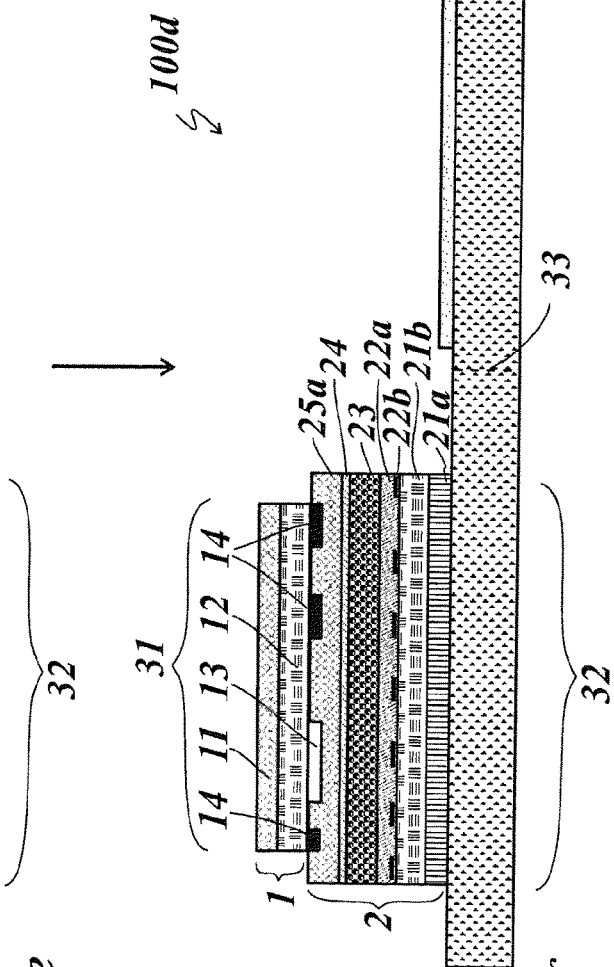

As shown in FIG. 7*e*, the carrier element 3 is now first peeled off the composite of the sub-elements 1 and 2 in the direction of the arrow in the area 31. The detachment layer 34 makes the detachment easier and remains on the carrier element 3. In addition, the detachment layer 34 prevents an undesired adhesion of the cold adhesive layer 25*a* of the second sub-element 2 to the carrier element 3. The cold adhesive layer 11 of the first sub-element 1 is hereby exposed and the intermediate product 100*d*, which is shown in FIG. 7*f*, is obtained. In this intermediate product 100*d* the composite of the sub-elements 1 and 2 is only joined to the carrier element 3 in the area 32 via the UV adhesive layer 21*a* of the detachment layer 21 of the second sub-element 2. The carrier element 3 is folded back into the flat ply.

Finally, as represented in FIG. 7*g*, the second sub-element 2 is also detached from the carrier element 3 in the area 32, by peeling the composite of the sub-elements 1 and 2 off the carrier element 3 in the direction of the arrow. The UV adhesive layer 21*a* of the detachment layer 21 of the second sub-element 2 separates from the polymer layer 21*b* of the detachment layer 21. Thus, as shown in FIG. 7*h*, for one thing, the finished, individualized vignette 4, as well as the remaining carrier element 100*f*, with the still adhering UV adhesive layer 21*a* and detachment layer 34, is obtained.

The finished vignette 4, which is represented separately again in FIG. 7*i*, now comprises the cold adhesive layer 11, the polymer layer 12, the partial optically variable layer 13, the individualization feature 14, the cold adhesive layer 25*a*, the reflective layer 24, the replication layer 23, the adhesion layer 22 and the polymer layer 21*b*.

Finally, the vignette 4 must still be affixed to the side 61 of a windshield 6 facing a vehicle interior 5. This is effected firstly by means of the cold adhesive layer 11 of the first sub-element 1. As can be recognized in FIG. 7*j*, the second sub-element 2 projects beyond the first sub-element 1 in an edge area 27. In this edge area, the cold adhesive layer 25*a* of the second sub-element 2 is exposed. This edge area can now also be adhered to the windshield 6, with the result that the finally attached individualized vignette 4 shown schematically in FIG. 8 on the windshield 6 finally results. The polymer layer 21*b* now forms the surface 41 of the vignette facing away from the windshield and protects it from environmental conditions.

Although the method for finishing and attaching the vignette 4 has only been described with reference to the system 100, the method explained above can, of course, also be applied to the systems 200 to 500 and all further variants described, and covered by the claims.

LIST OF REFERENCE NUMBERS

1 First sub-element
2 Second sub-element
3 Carrier element
4 Vignette
5 Vehicle interior
6 Windshield
11 Cold adhesive layer
12 Polymer layer (sub-element 1)
13 Optically variable layer
14 Individualization feature
15 Varnish layer
16 Cut
21 Detachment layer
21*a* UV adhesive layer
21*b* Polymer layer (sub-element 2)
21*c* Cold adhesive layer
21*d* Polymer layer (sub-element 2)
21*e* Reversibly detachable adhesive layer
22 Adhesion layer
22*a* Adhesion-promoter layer
22*b* Partial wax layer
23 Replication layer
24 Reflective layer
25 Adhesive
25*a* Cold adhesive layer
25*b* Silicone layer
25*c* Paper layer
26 Cut
27 Edge area
31 First sub-area (of the carrier element)
32 Second sub-area (of the carrier element)
33 Fold edge
34 Detachment layer
41 Surface (of the vignette)
61 Inside (of the windshield)

The invention claimed is:

1. A system for producing a security element in the form of a vignette for adhesion to a target substrate, for a window of a means of transport, comprising a carrier element with a first and a second surface, wherein a first sub-element of the security element is arranged in a first area of the first surface and a second sub-element of the security element is arranged in a second area of the first surface separated from the first area by a fold edge, which second sub-element can be made to overlap with the first sub-element by folding of the carrier element along the fold edge, wherein the second sub-element has a first adhesive layer which is arranged on the side of the second sub-element facing away from the carrier element, and wherein an individualization feature can be attached to a side of the first sub-element and/or the second sub-element facing away from the carrier element, wherein the second sub-element has a larger extension width than the first sub-element in all directions situated in the plane of extension of the carrier element such that an exposed projecting edge of the first adhesive layer is formed upon folding of the carrier element along the fold edge, the projecting edge extending beyond the extent of the first sub-element in all directions in the plane of extension of the carrier element for adhering the vignette to the target substrate.

2. A system according to claim 1, wherein the first and/or the second sub-element comprises at least one replication layer into which at least one relief structure is molded.

3. A system according to claim 2, wherein the replication layer has a layer thickness of from 0.2 to 20 µm.

4. A system according to claim 2, wherein the at least one relief structure is formed as a one- or two-dimensional diffractive grating structure, with a spatial frequency of between 100 lines/mm and 2500 lines/mm.

5. A system according to claim 2, wherein the at least one relief structure is formed by one or more relief structures, selected from: light-diffracting and/or light-refracting and/or light-scattering and/or light-focusing micro- or nanostructures, isotropic or anisotropic mat structures, binary or continuous Fresnel lenses, microprism structures, blazed gratings with a spatial frequency of between 100 lines/mm and 300 lines/mm, zero-order diffraction structures, with a spatial frequency of between 2500 lines/mm and 4000 lines/mm, microlens arrays, with a diameter of the microlenses of between 5 µm and 50 µm, and structures combining these.

6. A system according to claim 1, wherein the first and/or the second sub-element has at least one reflective layer.

7. A system according to claim 6, wherein the at least one reflective layer is patterned, in the form of a first item of optical information.

8. A system according to claim 6, wherein the first and/or the second sub-element has two or more different reflective layers, which are formed from different metallic materials, and which are molded in the form of different first items of optical information.

9. A system according to claim 6, wherein the reflective layer has a layer thickness of from 0.005 to 2 µm.

10. A system according to claim 1, wherein the first and/or the second sub-element comprises at least one partial optically variable layer and/or layer system.

11. A system according to claim 10, wherein the optically variable layer or the optically variable layer system is formed such that it contains at least one substance with an optical effect that differs depending on the angle of view and/or comprises at least one liquid crystal layer with an optical effect that differs depending on the angle of view and/or a thin-film layer stack with an interference color effect dependent on the angle of view and/or a replication layer with a molded relief structure.

12. A system according to claim 1, wherein the first sub-element comprises a second adhesive layer for adhering the security element to the windshield of the means of transport, and wherein the second adhesive layer is arranged on the side of the first sub-element facing the carrier element.

13. A system according to claim 12, wherein the second adhesive layer is a cold adhesive layer, with a layer thickness of from 1 to 40 µm.

14. A system according to claim 1, wherein a detachment layer is arranged between the first sub-element and the carrier element.

15. A system according to claim 1, wherein the first sub-element comprises a polymer layer made of or with polyester, PET (polyethylene terephthalate), PVC (polyvinyl chloride) or PP (polypropylene).

16. A system according to claim 15 wherein the polymer layer has a layer thickness of from 6 to 125 µm.

17. A system according to claim 15, wherein the first sub-element has an adhesion-promoter layer to increase the adhesion of the individualization feature, wherein the adhesion-promoter layer is applied to the side of the polymer layer facing away from the carrier element.

18. A system according to claim 15, wherein the partial optically variable layer or layer system is arranged on the side of the polymer layer facing away from the carrier element, and wherein the individualization feature can be applied in a common layer plane with the partial optically variable layer or layer system.

19. A system according to claim 1, wherein the second adhesion layer has a layer thickness of from 1 to 40 µm.

20. A system according to claim 1, wherein the second sub-element further comprises a detachment layer and a paper layer, the detachment layer being applied to the second adhesive layer on the side facing away from the carrier element, and which overhangs, at least in areas, the second adhesive layer lying under it and the paper layer being applied over the detachment layer.

21. A system according to claim 20, wherein the paper layer has a layer thickness of from 30 to 300 µm.

22. A system according to claim 20, wherein the detachment layer extends beyond at least one further layer of the second sub-element in the surface plane of the carrier element in at least one direction.

23. A system according to claim 1, wherein the second sub-element comprises a detachment layer for detaching the second sub-element from the carrier element.

24. A system according to claim 23, wherein the detachment layer has at least one polymer layer made of or with polyester, PET (polyethylene terephthalate), PVC (polyvinyl chloride) or PP (polypropylene), with a layer thickness of from 6 to 125 µm.

25. A system according to claim 23, wherein the detachment layer comprises at least one UV adhesive layer.

26. A system according to claim 25, wherein the UV adhesive layer has a layer thickness of from 0.1 to 10 µm.

27. A system according to claim 25, wherein the UV adhesive layer is arranged between two polymer layers.

28. A system according to claim 23, wherein the detachment layer comprises at least one reversibly detachable adhesive layer.

29. A system according to claim 28, wherein the reversibly detachable adhesive layer has a layer thickness of from 1 to 40 µm.

30. A system according to claim 23, wherein the second sub-element has at least one adhesion layer which has properties of adhesion to the adjoining layers that differ in areas and, at the points where it is provided, increases or reduces the adhesion of the adjoining layers.

31. A system according to claim 30, wherein the adhesion layer comprises an adhesion-promoter layer.

32. A system according to claim 31, wherein the adhesion-promoter layer has a layer thickness of from 0.005 to 20 µm.

33. A system according to claim 32, wherein the adhesion layer comprises a partial wax layer or a partial adhesive layer.

34. A system according to claim 33, wherein the partial wax layer has a layer thickness of from 0.002 to 1 µm.

35. A system according to claim 30, wherein the adhesion layer is arranged between a replication layer and a detachment layer.

36. A system according to claim 1, wherein the carrier element is formed from transparent or opaque polyester.

37. A system according to claim 36, wherein the carrier element has a layer thickness of from 25 to 250 µm.

38. A system according to claim 1, wherein the carrier element is formed from paper.

39. A system according to claim 38, wherein the carrier element has a layer thickness of from 30 to 300 µm.

40. A system according to claim 1, wherein the first and/or the second sub-element has a cut which extends from a surface of the respective sub-element facing away from the carrier element, perpendicularly to the plane of extension of the carrier layer, through at least one layer of the respective sub-element.

41. A method for individualizing a security element in the form of a vignette for adhesion to a target substrate, for a windshield of a vehicle, with the steps:
  a) providing a system according to claim 1;
  b) attaching an individualization feature to a side of the first and/or the second sub-element facing away from the carrier element;
  c) folding the carrier element along the fold edge, wherein the sub-elements are made to overlap with each other such that the second sub-element protrudes beyond the first sub-element on all sides;
  d) adhering the sub-elements by means of the adhesive arranged on the side of the second sub-element facing away from the carrier element.

42. A method according to claim 41, wherein the individualization feature is applied by printing.

43. A method according to claim 41, wherein a serial number, a name, a license plate number or the like is applied as an individualization feature.

44. A method according to claim 41, wherein, before the folding in step c), a detachment layer is detached from a surface of the second sub-element facing away from the carrier element and thus a second adhesive layer of the adhesive comprising the detachment layer and the second adhesive layer is exposed for the adhesion in step d).

45. A method according to claim 41, wherein, in a further step e), the carrier element is detached from the adhered sub-elements.

46. A method according to claim 45, wherein, in step e), the carrier element is detached from the first sub-element along a detachment layer, wherein an adhesive layer of the first sub-element is exposed, by means of which the security element can be adhered to the windshield of a vehicle.

47. A method according to claim 45, wherein, in step e), the carrier element is detached from the second sub-element such that a detachment layer of the second sub-element separates such that an adhesive layer of the detachment layer remains on the carrier element and a polymer layer of the detachment layer forms a surface of the security element.

48. A method according to claim 47, wherein a UV adhesive layer, cold adhesive layer or reversibly detachable adhesive layer is used as adhesive layer.

49. A security element in the form of a vignette for a vehicle, that can be obtained by means of a method according to claim 45.

50. A security element according to claim 49, wherein the security element is adhered to a windshield of a vehicle.

* * * * *